United States Patent
Murase et al.

(10) Patent No.: US 7,886,162 B2
(45) Date of Patent: Feb. 8, 2011

(54) CRYPTOGRAPHIC SECURE PROGRAM OVERLAYS

(75) Inventors: Masana Murase, Yokohama (JP);
Wilfred E. Plouffe, Jr., San Jose, CA (US); Kanna Shimizu, Austin, TX (US); Masaharu Sakamoto, Yokohama (JP); Vladimir Zbarsky, Newark, CA (US)

(73) Assignee: International Business Machines Corporation, Armonk, NY (US)

( * ) Notice: Subject to any disclaimer, the term of this patent is extended or adjusted under 35 U.S.C. 154(b) by 878 days.

(21) Appl. No.: 11/754,649

(22) Filed: May 29, 2007

(65) Prior Publication Data
US 2008/0301468 A1    Dec. 4, 2008

(51) Int. Cl.
*G06F 12/14* (2006.01)
*G06F 9/24* (2006.01)
*G06F 7/04* (2006.01)
*H04L 29/06* (2006.01)
*H04L 9/28* (2006.01)
*G08B 29/00* (2006.01)
*H04K 1/00* (2006.01)

(52) U.S. Cl. .......................... 713/193; 713/1; 713/150; 713/161; 713/165; 713/189; 713/194; 726/26; 726/27; 726/34; 380/255; 380/28

(58) Field of Classification Search ................. 713/193, 713/1, 150, 161, 165, 189, 194; 726/26, 726/27, 34; 380/255, 28
See application file for complete search history.

(56) References Cited

U.S. PATENT DOCUMENTS

| | | | |
|---|---|---|---|
| 5,987,129 A | | 11/1999 | Baba |
| 6,704,871 B1 * | | 3/2004 | Kaplan et al. ............... 713/192 |
| 7,305,564 B2 | | 12/2007 | Jin et al. |
| 7,516,331 B2 | | 4/2009 | Jin et al. |
| 2005/0022026 A1 | | 1/2005 | Riordan |
| 2005/0144440 A1 | | 6/2005 | Catherman et al. |
| 2006/0182124 A1 * | | 8/2006 | Cole et al. ............. 370/395.54 |
| 2006/0195906 A1 | | 8/2006 | Jin et al. |
| 2006/0206727 A1 * | | 9/2006 | Wasson et al. ............... 713/189 |
| 2006/0233149 A1 * | | 10/2006 | Rustagi et al. ............... 370/342 |
| 2006/0282681 A1 * | | 12/2006 | Scheidt et al. .............. 713/186 |
| 2007/0143223 A1 * | | 6/2007 | Bhave et al. .................. 705/59 |
| 2007/0160197 A1 | | 7/2007 | Kayaga et al. |
| 2007/0160200 A1 * | | 7/2007 | Ishikawa et al. ............... 380/30 |
| 2007/0245410 A1 | | 10/2007 | Perlman et al. |
| 2008/0005565 A1 | | 1/2008 | Shiga et al. |
| 2008/0072070 A1 * | | 3/2008 | LaMacchia et al. ......... 713/193 |
| 2008/0091945 A1 * | | 4/2008 | Princen et al. .............. 713/170 |

(Continued)

*Primary Examiner*—Aravind K Moorthy
(74) *Attorney, Agent, or Firm*—Dillon & Yudell LLP

(57) ABSTRACT

A method, computer program product, and data processing system for executing larger-than-physical-memory applications while protecting sensitive program code (and also data) from unauthorized access in a memory space not subject to protection fault or page fault detection are disclosed. Large applications are accommodated by providing a mechanism for secure program overlays, in which a single large application is broken into two or more smaller applications (overlays) that can be executed from the same memory space by overwriting one of the smaller applications with another of the smaller applications when the latter needs to be executed. So that the data may be shared among these smaller applications, each of the applications contains embedded cryptographic keys, which may be used to encrypt or decrypt information to be stored persistently while control is transferred from one application to the other.

20 Claims, 9 Drawing Sheets

U.S. PATENT DOCUMENTS

| | | |
|---|---|---|
| 2008/0095371 A1 | 4/2008 | Vataga |
| 2008/0117679 A1* | 5/2008 | Srinivasan et al. ..... 365/185.04 |
| 2008/0148061 A1 | 6/2008 | Jin et al. |
| 2008/0229425 A1* | 9/2008 | Perrin et al. .................. 726/26 |
| 2008/0235507 A1* | 9/2008 | Ishikawa et al. ............ 713/150 |

* cited by examiner

CRYPTOGRAPHIC SECURE PROGRAM OVERLAYS

CROSS-REFERENCE TO RELATED APPLICATIONS

The present application is related to U.S. patent application Ser. No. 11/754,678, entitled "Cryptographically-enabled Privileged Mode Execution;" U.S. patent application Ser. No. 11/754,667, entitled "Application Specific Secret Generation;" and U.S. patent application Ser. No. 11/754,658, entitled "Updateable Secure Kernel Extensions," which are filed even date hereof, assigned to the same assignee, and incorporated herein by reference.

BACKGROUND OF THE INVENTION

1. Technical Field

The present invention relates generally to memory protection and privileged software execution in a data processing system. Specifically, the present invention is directed to a method of providing a privileged mode without the necessity of detecting protection faults.

2. Description of the Related Art

Many, if not most, modern operating systems and the hardware platforms that support them provide some form of facility for "memory protection." Each application is allocated memory by the operating system and must access only those addresses in memory allocated to it. If a process attempts to access memory that is outside of the memory regions allocated to it, the illegal access attempt is detected by the operating system as an error (often called a "protection fault" or "segmentation fault") and the offending process is terminated before disaster occurs. Memory protection can prevent many system crashes or other destructive behavior caused by software errors or malicious code ("malware"). Another important reason for restricting access to certain memory locations is to prevent proprietary or security-sensitive data or code from being examined by user-level processes, so as to prevent the creation of malware or the reverse engineering or unauthorized copying of proprietary information.

Memory protection is often utilized in conjunction with virtual memory. Virtual memory allows programs to execute in a "virtual address space," which can exceed the actual physical memory of the machine. Virtual memory works by swapping pages of memory to/from secondary storage (such as a disk) so that only those pages currently being used are actually contained in memory. In virtual memory, a "page fault" occurs when an address being accessed in the virtual memory space does not currently exist in the physical memory and the page containing that address must be swapped into physical memory before the memory access is completed.

Although memory protection and virtual memory schemes are very useful, particularly for running today's very complex software, the protection schemes themselves increase the complexity of the computing hardware and the operating systems it supports. This is largely due to the fact that each memory access made by an application must be intercepted before being carried out, so that protection faults and page faults may be detected. In some applications, this added complexity is highly undesirable. For example, a processor intended for high-end multimedia or real-time computationally intensive applications may have multiple specialized processor cores (such as specialized vector processing cores) on a single chip for intensive number-crunching. In such instances, the added hardware and software complexity involved in implementing conventional memory protection for each core's local memory could severely impact the attainable degree of parallelism as well as the performance of each individual processor core.

What is needed, therefore, is a method of protecting sensitive data and code from unauthorized reads and writes and of executing larger-than-available-memory applications without relying on the additional complexity of protection- and page-fault-detection mechanisms. The present invention provides a solution to this and other problems, and offers other advantages over previous solutions.

SUMMARY OF THE INVENTION

Accordingly, the present invention provides a method, computer program product, and data processing system for executing larger-than-available-memory applications while protecting sensitive program code (and also data) from unauthorized access in a memory space not subject to protection fault or page fault detection.

In a preferred embodiment, secure boot hardware loads the sensitive code from a storage location accessible only to the secure boot hardware itself and decrypts the sensitive code into a portion of the processor-accessible memory space, from which the code is executed. Once execution of the sensitive code has completed, all or at least a portion of the code is deleted before passing control to application software. If the application software needs to cause the sensitive code to be executed, the secure boot hardware is activated to reload/decrypt a fresh copy of the sensitive code into the memory space and cause the code to be executed. Before control is returned to the application software, the sensitive code is again deleted to prevent unauthorized access.

Large applications are accommodated by providing a mechanism for secure program overlays, in which a single large application is broken into two or more smaller applications (overlays) that can be executed from the same memory space by overwriting one of the smaller applications with another of the smaller applications when the latter needs to be executed. So that the data may be shared among these smaller applications, each of the applications contains embedded cryptographic keys, which may be used to encrypt or decrypt information to be stored persistently while control is transferred from one application to the other. In a preferred embodiment, in which public-key cryptography is utilized, each application has a private key, which only that application can access, as well as a public key, which is shared among all of the smaller applications making up the large application.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
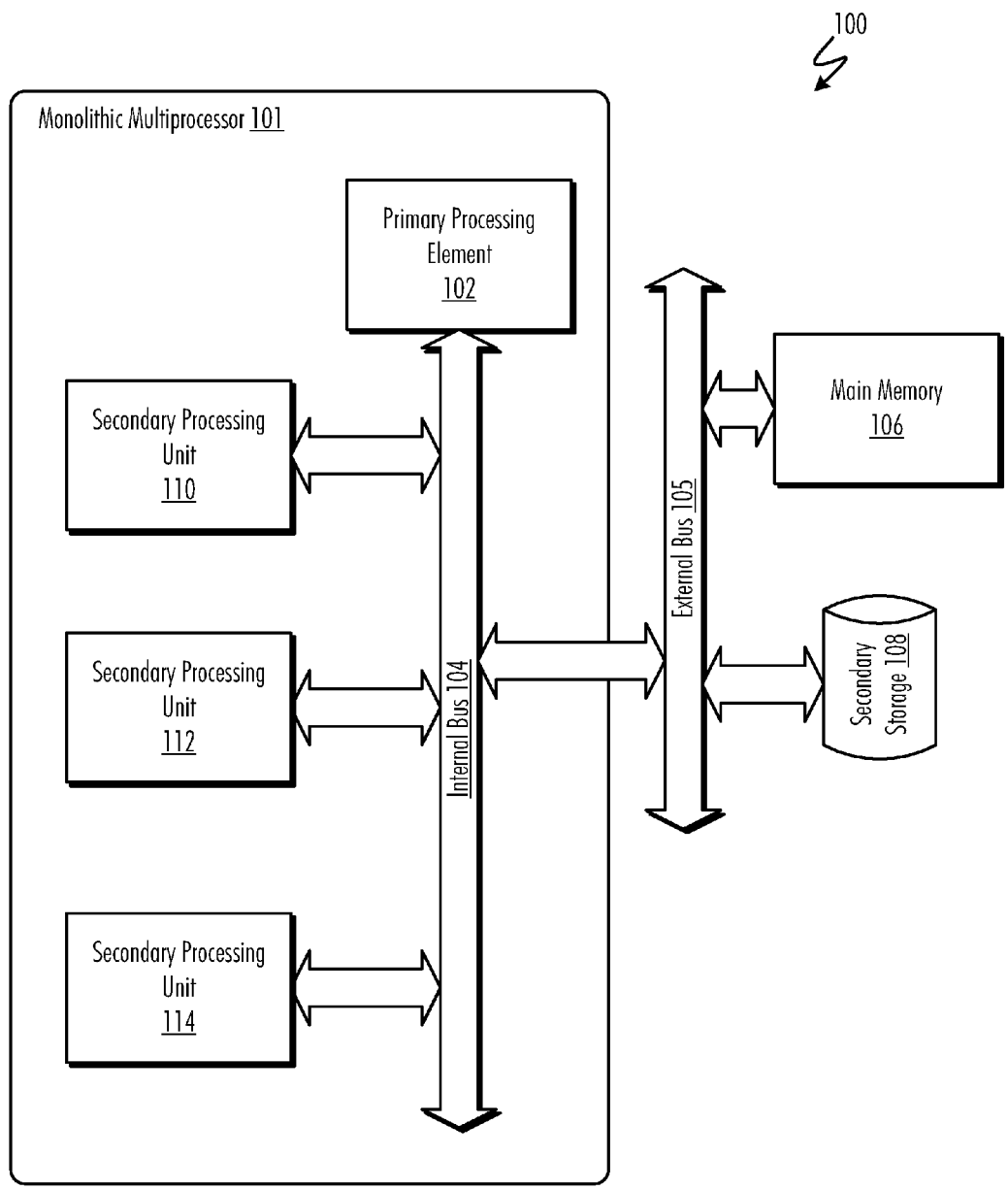
FIG. 1 is a block diagram of an exemplary data processing system in which a preferred embodiment of the present invention may be implemented.

FIG. 1 is a block diagram of an exemplary data processing system 100 in which a preferred embodiment of the present invention may be implemented. Data processing system 100 comprises a monolithic multiprocessor 101 containing several processor cores on a single integrated circuit. Monolithic multiprocessor 101 includes a general-purpose primary processing element 102 and several secondary processing units for performing more specialized, computationally-intensive functions (secondary processing units 110, 112, and 114), connected by an internal bus 104. An external bus 105, external to monolithic multiprocessor 101, interfaces monolithic multiprocessor 101 with main memory 106 and secondary storage 108, as well as other peripheral devices (not shown).

Each of secondary processing units 110, 112, and 114 contains its own local memory in addition to main memory 106. This allows secondary processing units 110, 112, and 114 to operate independently of primary processing element 102 in isolation mode, in which a particular secondary processing unit performs computations using its local memory without interference from primary processing element 102. When not in isolation mode, secondary processing units 110, 112, and 114 may allow primary processing element 102 to access their respective local memory spaces. In this preferred embodiment primary, processing element 102 includes hardware support for memory protection (in main memory 106), but secondary processing units 110, 112, and 114 do not contain memory protection hardware to prevent improper memory accesses of local memory within a secondary processing unit while in isolation mode.

Figure 2:
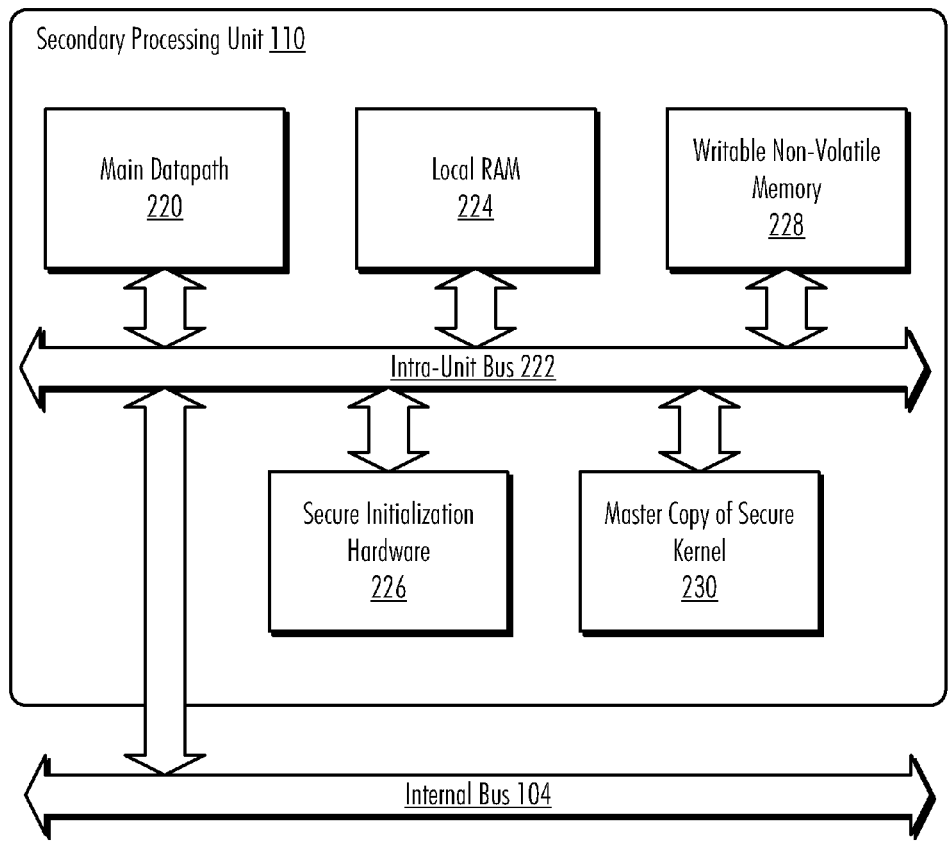
FIG. 2 is a block diagram of a secondary processing unit in accordance with a preferred embodiment of the present invention.

A more detailed depiction of secondary processing unit 110 in accordance with a preferred embodiment of the present invention is provided in FIG. 2. Secondary processing unit 110 is interfaced to internal bus 104 (internal to monolithic multiprocessor 101), but also contains its own intra-unit bus 222 internal to itself. In addition to its main datapath 220, secondary processing unit 110 contains its own local random access memory (RAM) 224 and writeable non-volatile memory 228 (such as flash memory), for storing information persistently between operating sessions.

Startup of secondary processing unit 110 (whether a warm boot or cold boot) is handled by secure boot hardware 226, which is independent of main datapath 220. In addition to resetting and enabling main datapath 220 during a boot, secure boot hardware 226 also contains decryption hardware for decrypting an encrypted master copy of a system kernel (master copy 230) into local RAM 224 as part of the boot process. The decryption key for decrypting master copy 230 is embedded into secure boot hardware 226 such that it cannot be read from main datapath 220 (or from intra-unit bus 222, for that matter). This can be done by storing the key securely in non-volatile memory internal to secure boot hardware 226 or by actually hard-wiring the decryption process into the logic of secure boot hardware 226, such that the decryption key is not stored, but integrated implicitly into the decryption logic. Once the system kernel has been decrypted, secure boot hardware 226 triggers main datapath 220 to begin executing the decrypted secure kernel. The decrypted secure kernel then uses a combination of public-key cryptography and digital signature verification to provide a software-based form of limited memory protection that is local to secondary processing unit 110 and may even be used in isolation mode.

In public-key cryptography, separate keys are used for encryption and decryption. Each party has two keys, a "public key," used for encryption, and a "private key" used to decrypt messages encrypted with the public key. A party's public key is "public" in the sense that the party makes the public key available to anyone who wishes to send encrypted messages to that party, while the private key remains secret. Even though multiple parties may possess the same public key, only the private key may be used to decrypt messages encrypted with the public key. In other words, it is computationally infeasible to decrypt a message encrypted with the public key unless one possesses the private key. This is in contrast to traditional secret key cryptosystems in which the same secret key is used for both encryption and decryption. Perhaps the best-known and most widely used public-key cryptosystem is the Rivest-Shamir-Adleman or RSA crypto system, which is described in U.S. Pat. No. 4,405,829. Public-key cryptography is widely used for making secure transactions over the Internet, as it prevents eavesdropping by third parties.

Although public-key cryptography is very useful in keeping information secret, public-key cryptography does not guard against forged or corrupted information. Since the public key can be distributed to others, and anyone possessing the public-key can encrypt messages that may only be read with the private key, public-key cryptography provides no way for the recipient of a message to know whether the message being received is genuine or originates with the source it purports to have originated from. For this reason, public-key cryptography is often used in conjunction with other cryptographic techniques that can be used to authenticate communications and verify the integrity of a message. Digital signatures are a natural complement to public-key cryptography that can be used to verify the identity of the originator of a message. With digital signatures, the sender of a message has a public/private key pair. When the sender sends a message, the sender uses its private key and the text of the message itself to compute a code that can be affixed to the message. This code is referred to as a digital signature. The recipient of the message will possess the sender's public key, which it can use to verify that the digital signature attached to a particular message was signed using the private key of the sender corresponding to that public key. One of the earliest digital signature schemes was the Rivest-Shamir-Adleman or RSA digital signature scheme, which, like the RSA public-key cryptosystem, is described in U.S. Pat. No. 4,405,829.

A preferred embodiment of the present invention makes extensive use of both public-key cryptography and digital signatures to provide data secrecy, preserve data integrity, and prevent unauthorized actions. However, one skilled in the art will recognize that implementation of the present invention is not dependent on the use of any particular type of cryptosystem or digital signature scheme. Any presently known or future-developed cryptosystem or digital signature scheme may be utilized in an embodiment of the present invention.

Figure 3:
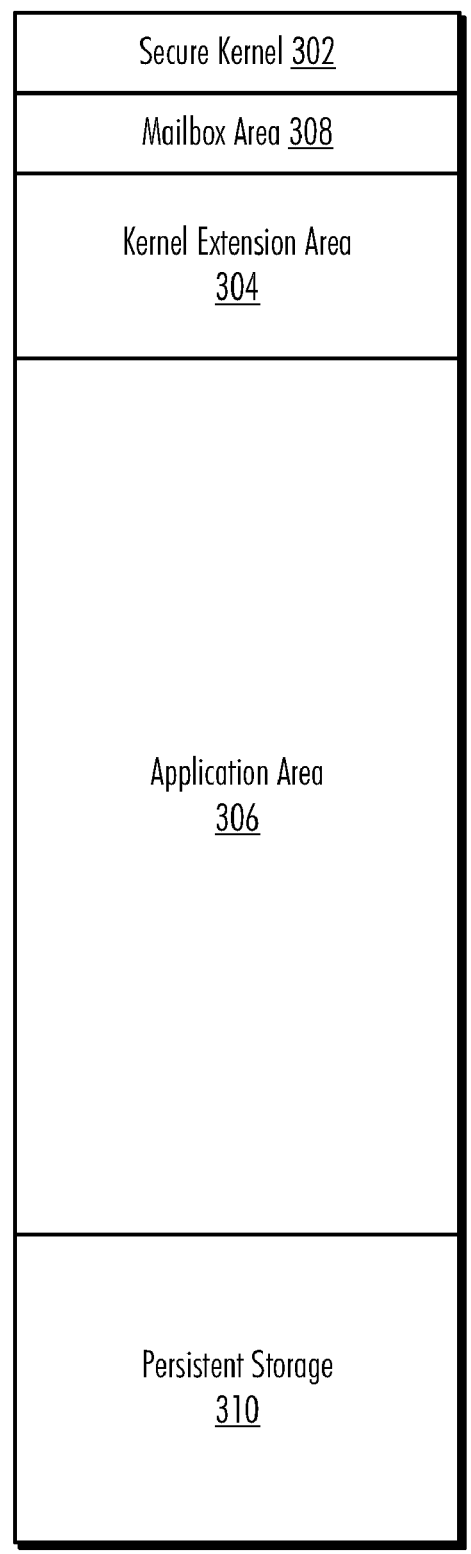
FIG. 3 is a memory map showing memory usage in a data processing system made in accordance with a preferred embodiment of the present invention.

FIG. 3 is a memory map showing memory usage in a data processing system made in accordance with a preferred embodiment of the present invention. The most privileged piece of software in the system is secure kernel 302, whose main function is to validate and authenticate other pieces of software, including kernel extensions, which reside in kernel extension area 304. Kernel extensions provide the main functionality to system software, and may be updated, replaced, or added, as necessary or desired. Secure kernel 302, on the other hand, is endowed with minimal functionality and is intended to remain the same during the lifetime of the data processing system. Secure kernel 302 is "secure" because its sensitive internals are shielded from inspection or access by other programs residing in the data processing system. As will be seen, this security is maintained through a combination of selective deletion of secret information and careful use of cryptographic techniques. Among the sensitive pieces of internal information contained in secure kernel 302 is a private key that is specific to that particular copy of secure kernel 302. In a preferred embodiment of the invention, where secure kernel 302 is written into the firmware of a processor chip, secure kernel 302's private key is specific to the particular chip (so that another chip from the same manufacturer of the same type and version would still have a different private key). Secure kernel 302 also has a public key corresponding to its private key, but the private key need not be kept secret (since it is a public key). Other sensitive pieces of information contained in secure kernel 302 would include other cryptographic keys as well as instructions for performing operations deemed to be privileged.

Secure kernel 302 is loaded into memory from a master copy at boot time. This master copy is stored in encrypted form in software-accessible memory space of the data processing system. The hardware authenticates this master copy before executing secure kernel 302. The decryption key needed to decrypt the master copy is incorporated into the boot hardware of the data processing system is not accessible to software. Consequently, secure kernel 302 can only be loaded into memory when the boot hardware performs a boot (or reboot) of the system. This not only keeps sensitive portions of secure kernel 302 secret, but it also ensures that secure kernel 302, when loaded into memory, is genuine and has not been tampered with.

Application software is loaded into and executes from application area 306. Because no hardware memory protection scheme exists in a preferred embodiment of the present invention, applications executing from application area 306 may freely access other parts of the memory space, including areas intended for system software, such as kernel extension area 304 and secure kernel area 302. The effect of memory protection is achieved, however, by deleting sensitive information from secure kernel area 302 and kernel extension area 304 prior to transferring control to an application residing in application area 306, and by using secure boot hardware to reload secure kernel 302 and any kernel extensions, when it becomes necessary to invoke kernel extension code.

For an application residing in application area 306 to make use of a kernel service, the application first writes information to mailbox area 308. This information will include information regarding the particular kernel service requested as well as information necessary to return control to the application, such as a callback address. Once this information has been written to mailbox area 308, the application triggers a reboot. This causes a fresh copy of secure kernel 302 (including any sensitive portions thereof) to be loaded before any kernel services are performed. The sensitive portions of secure kernel 302 as well as any kernel extensions are then deleted before returning control to the application, according to the instructions left in mailbox area 308.

A similar mechanism is also used for kernel extensions to prevent particular kernel extensions from having access to all of secure kernel 302's secrets. Those sensitive portions of secure kernel 302 that are not needed by a kernel extension to perform a task are deleted by secure kernel 302 prior to passing control to the kernel extension. In this way, secure kernel 302 can delegate all or only some of its powers and responsibilities to a given kernel extension. Using kernel extensions to perform most system software tasks allows system software to be updated without having to modify secure kernel 302. This allows secure kernel 302's master copy to be decrypted using an unrecoverable decryption key incorporated in secure boot hardware. Since secure kernel 302 will never change, even if other system software is updated or replaced, there is no need to store the decryption key (or a corresponding encryption key, assuming it is different) anywhere outside of the secure boot hardware—or if the decryption process is hard-wired into the logic of the hardware, anywhere at all.

Additionally, a nonvolatile storage area 310 is provided to allow applications to store persistent data. Persistent data is data that remains stored between invocations of an application. An example of persistent data might be a database, or in the case of a video game console, a list of high scorers for a game.

Figure 4:
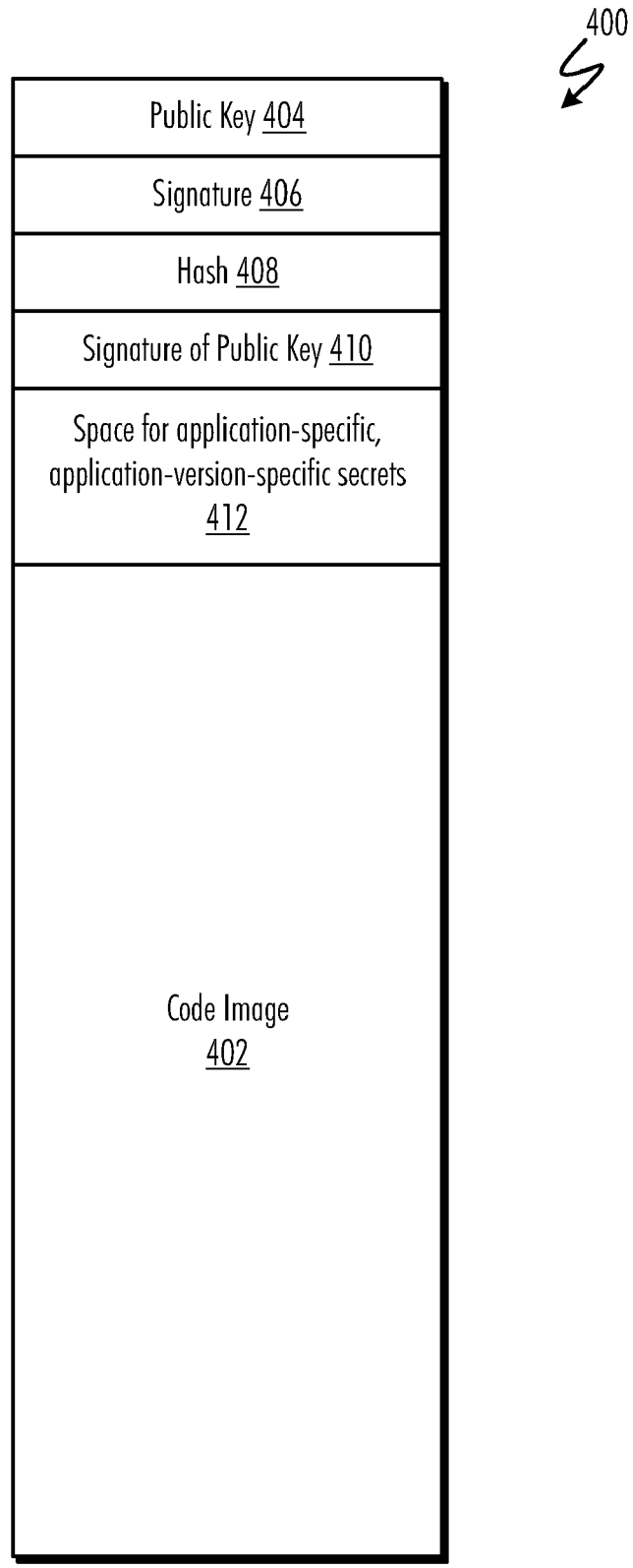
FIG. 4 is a memory diagram of an application 400 for use in a data processing system made in accordance with a preferred embodiment of the present invention.

As mentioned above, secure kernel 302 authenticates and validates the integrity of other pieces of software in the data processing system, including applications and kernel extensions. FIG. 4 is a memory diagram of an application 400 for use in a data processing system made in accordance with a preferred embodiment of the present invention. In addition to the actual executable code itself (code image 402), application 400 includes a public key 404, which may be used to verify a digital signature 406 of application 400. In a preferred embodiment of the present invention, public key 404 is specific to a particular application title, but not to a particular version of that application, so that multiple versions of the same application have the same public key 404.

In addition, a cryptographic hash value 408 computed over code image 402 is provided to allow the integrity of application 400 to be verified. A hash value is a numerical value that is the result of a function mapping a larger block of data into a limited number of bits. A cryptographic hash value is computed using a one-way function (OWF), which is a function in which it is computationally intractable to compute the function's inverse. An example of a cryptographic hash value is the well-known SHA-1 algorithm (Secure Hash Algorithm 1), developed by the National Institute of Standards and Technology (NIST), a U.S. federal agency. Other cryptographic hash algorithms (such as SHA-256, MD5 [Message Digest 5], and many others) are known in the art and may be applied to the present invention without limitation and without departing from the scope and spirit thereof. To verify the integrity of application 400, the cryptographic hash value of code image 402 can be computed by secure kernel 302 and compared to cryptographic hash value 408 stored as part of the application. If the two values match, the application's integrity has not been compromised (i.e., code image 402 has not been tampered with or become corrupted).

Since public key 404 is used to verify signature 406, it is important that public key 404 not be a forgery. Therefore, a digital signature computed over public key 404 (public key signature 410) is also included in application 400. This signature can be verified by secure kernel 302 using one or more pre-defined public keys known to secure kernel 302.

Finally, additional storage space 412 is provided for the creation of application-specific and application-version-specific secrets. An application may wish to store or transmit information that can only be viewed by other versions of that application or other instances of the same version of that application. In a preferred embodiment of the present invention, secure kernel 302, upon loading an application such as application 400, generates an application-specific secret and an application-version-specific secret, which are stored in storage area 412. The application-specific secret is generated by computing a one-way function of secure kernel 302's private key (which is specific to that copy of secure kernel 302) and public key 404, which is specific to the application (but not version specific). Thus, every instance of any version of the application running under that particular copy of secure kernel 302 will receive the same application-specific secret from secure kernel 302.

The application-version-specific secret, on the other hand, is generated by computing a one-way function of secure kernel 302's private key and a cryptographic hash value of the application image (possibly, but not necessarily the same as hash value 408). This results in a secret that is specific to not only the application title and secure kernel instance, but to the particular version of the application itself.

These application-specific and application-version-specific secrets may be used for secret-key (symmetric-key) encryption of information that is to be comprehendible to only a particular application title or particular version of an application (for storage in non-volatile storage 310, for example). Further, because the secrets are computed using private key information known only to a particular copy of secure kernel 302, two different processors (running two different copies of secure kernel 302 with different private keys) will compute different application-specific and application-version-specific secrets, thus making the overall encryption scheme harder to crack. An additional benefit to having the secrets computed by secure kernel 302 upon loading is that the secrets themselves need not be stored permanently. When an application terminates, the secrets can be safely deleted, since secure kernel 302 will re-compute the secrets (with the same value) the next time the application is executed.

Kernel extensions resemble applications in that they also include a digital signature, so they may be organized in much the same way as application 400 is in FIG. 4. An important difference between kernel extensions and applications, however, is that kernel extensions are stored in encrypted form such that they can only be decrypted using secure kernel 302's private key, which itself is only available when secure kernel 302 is loaded and executed immediately following a secure boot (using the secure boot hardware). Public-key cryptography makes it possible to update, replace, or add kernel extensions without compromising secure kernel 302's private key. The source (manufacturer, publisher, distributor, etc.) of a kernel extension need only be supplied secure kernel 302's public key (which, unlike the private key, is not a secret) in order to encrypt a new kernel extension so that only that copy of secure kernel 302 (with its unique private key) can decrypt the kernel extension.

As stated above, secure kernel 302 may delegate one or more of its powers/responsibilities to a kernel extension. Secure kernel 302 does this by retaining (i.e., not deleting) the sensitive portions of secure kernel 302 needed to perform a particular privileged task when passing control to the kernel extension. Secure kernel 302 determines which portions to retain by examining the public key used to validate the kernel extension's digital signature. Secure kernel 302 recognizes a pre-defined set of "privileged public keys" used to sign kernel extensions. Each privileged public key is associated with a particular level of privilege—i.e., each privileged public key corresponds to one or more sensitive parts of secure kernel 302 to be retained when secure kernel 302 passes control to a kernel extension signed with that privileged public key. Thus, a kernel extension may be delegated all or only some of the secrets/privileges of secure kernel 302, according to the privilege level specified by the kernel extension's public key.

Figure 5:
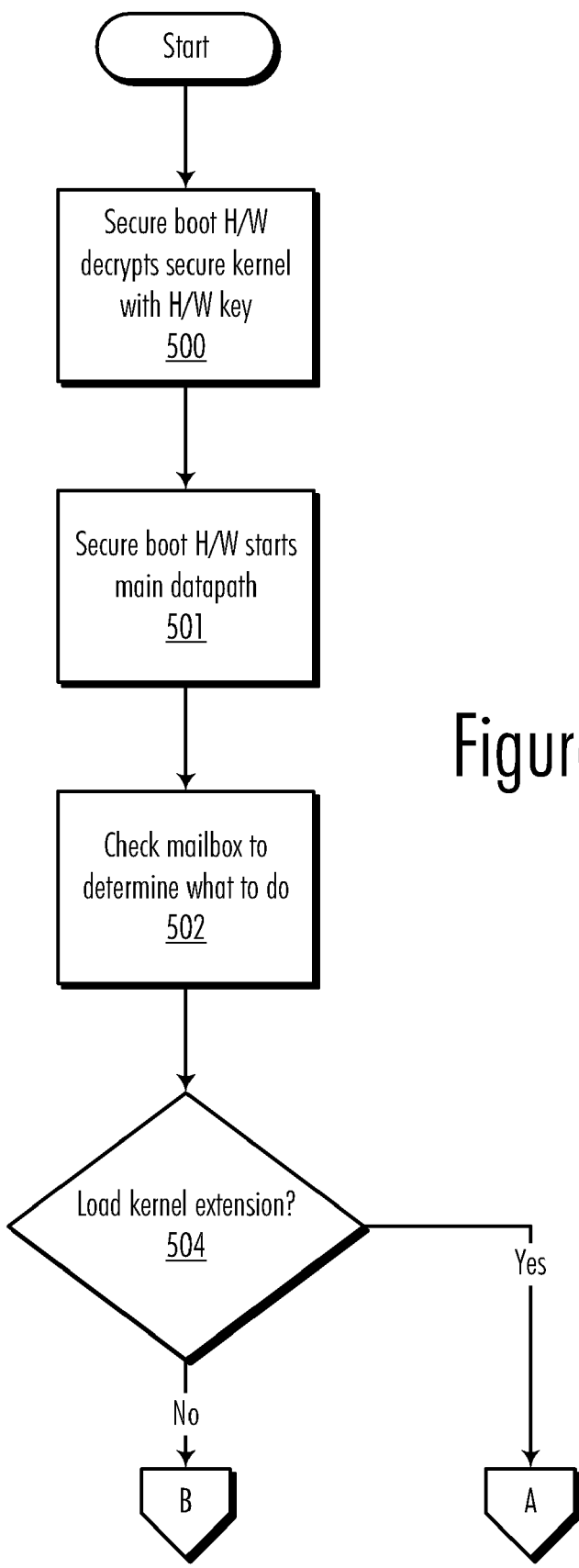
FIGS. 5-7 are a flowchart representation of a basic execution flow of a secure kernel in accordance with a preferred embodiment of the present invention.
Figure 6:
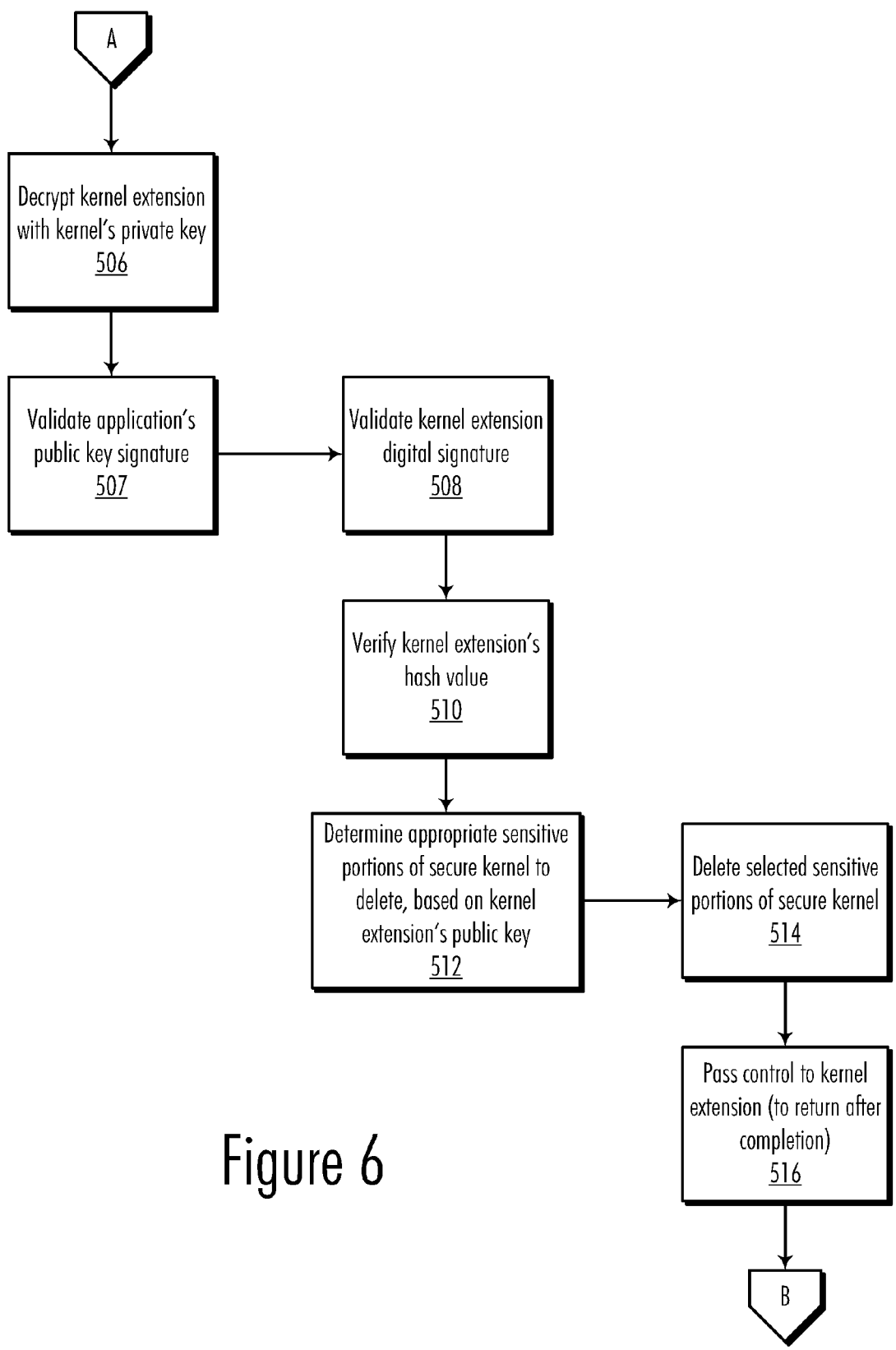
Figure 7:
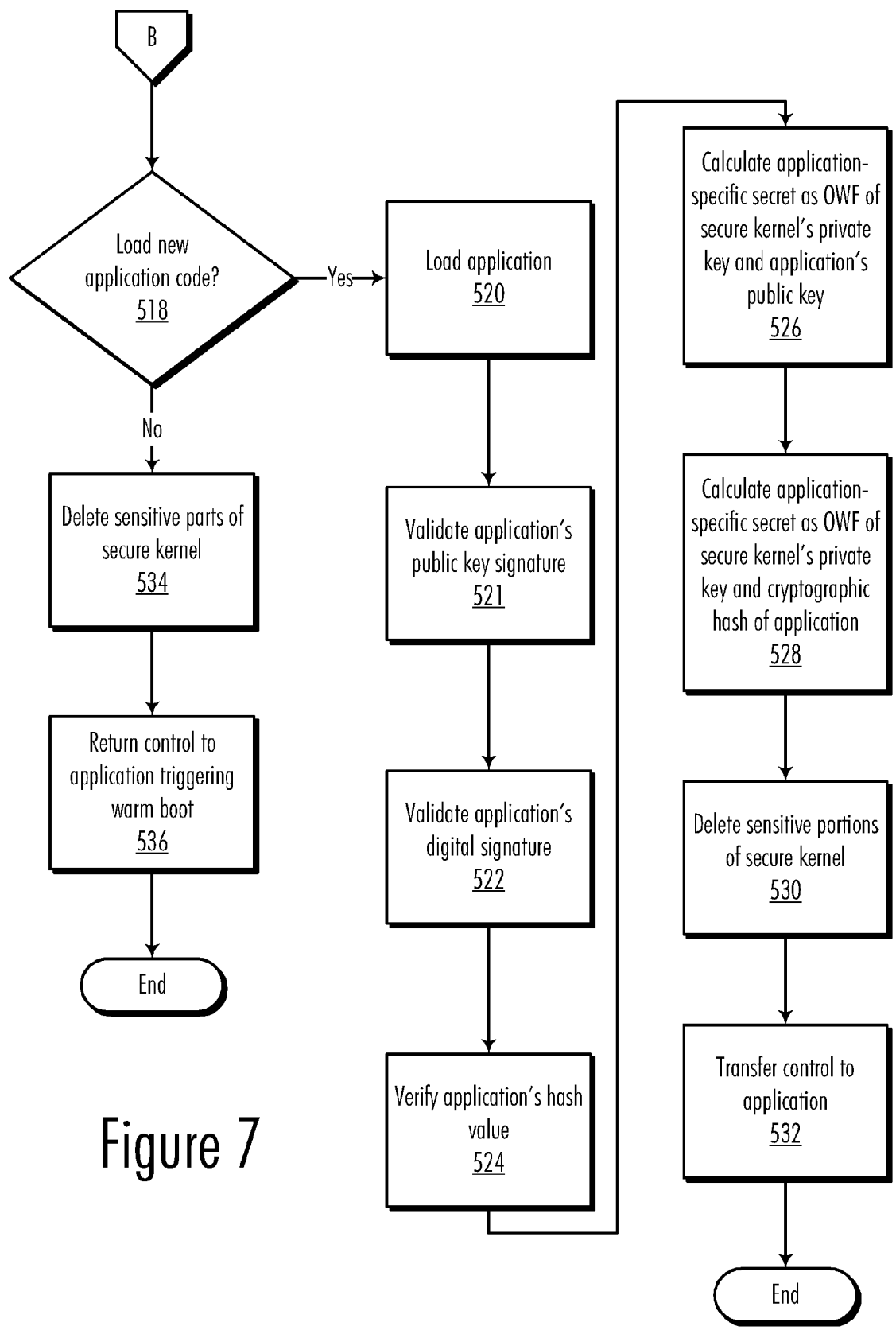

FIGS. 5-7 are together a multi-page flowchart representation of the basic flow of execution of a secure kernel made in accordance with a preferred embodiment of the present invention. FIGS. 5-7 illustrate how the various cryptographic features of a preferred embodiment work together under the direction of the secure kernel to create a system of privileged and non-privileged program code without the use of dedicated protection hardware. Before turning to the specifics of FIGS. 5-7, it should first be noted that for the purpose of simplifying the presentation, each of the digital signature and hash value verifications has been presented here as a processing step (rectangle) rather than as a decision (diamond), although by nature each of these actions involves a determination as to whether the validation or verification succeeds or fails. It should be understood throughout the following description that the failure of any verification or validation action in FIGS. 5-7 will trigger an error or exception condition that will interrupt the normal flow of execution depicted in FIGS. 5-7. Hence, each validation or verification described below should be understood as also implicitly including a decision step branching to an error condition on failure of the validation or verification.

Turning now to FIG. 5, on bootup (warm or cold boot), before the main datapath of the data processing system begins processing instructions, the secure boot hardware decrypts the secure kernel into processor-accessible memory from the encrypted master copy (block 500). Once the secure kernel has been decrypted, the secure boot hardware starts the main datapath of the data processing system, which then begins to execute the secure kernel (block 501).

The secure kernel then checks mailbox area 308 to determine what actions should be taken following the boot, such as loading/executing a particular kernel extension or returning control to an application that triggered a warm boot (block 502). Additionally, checking mailbox area 308 allows the secure kernel to determine whether a warm or cold boot has occurred. Next a determination is made as to whether a kernel extension should be loaded (block 504). If so (block 504: yes), then the secure kernel decrypts the desired kernel extension into processor-accessible memory using the secure kernel's private key (block 506). The secure kernel validates the digital signature of the public key supplied with the kernel extension using a pre-defined public key known to the secure kernel (i.e., stored in the secure kernel's "key ring") (block 507). The secure kernel then validates the digital signature of the kernel extension itself using the kernel extension's public key (block 508). Next, the secure kernel verifies the integrity of the kernel extension using by computing a hash value of the kernel extension and comparing the computed hash value to that supplied with the kernel extension (block 510).

If the kernel extension passes each of these validations/verifications, a determination is made as to which sensitive portions of the secure kernel should be deleted or retained before passing control to the kernel extension (block 512). As stated above, this determination is based on which public key was used to sign the kernel extension, each public key corresponding to a set of sensitive portions to be retained (or equivalently, which sensitive portions should be deleted) before passing control to a kernel extension signed with that public key. Once it is determined which sensitive portions of the secure kernel should be retained, the remainder of the sensitive portions of the secure kernel are deleted (block 514) and the secure kernel passes control to the loaded kernel extension (block 516).

Upon returning to execution of the secure kernel from the execution of a loaded kernel extension (following block 516), or if no kernel extension was loaded (block 504: No), a determination is made as to whether new application code should be loaded into memory for execution (block 518). If so (block 518: Yes), the application code is loaded into processor-accessible memory (block 520). The signature of the public key of the newly loaded application code is then validated using a pre-defined public key known to the secure kernel (block 521). The signature of the application itself is then validated using the application's validated public key (block 522). Next, the integrity of the application is verified by computing a hash value of the application and comparing the computed hash value to that supplied with the application (block 524).

Once the application has been validated and verified, the secure kernel generates an application-specific secret by computing a one-way function from the secure kernel's private key and the application's public key (block 526). The secure kernel also generates an application-version-specific secret by computing a one-way function from the secure kernel's private key and a hash value computed from the bytes of the application itself (block 528). These secrets are stored by the secure kernel in memory so as to be accessible to the loaded application (e.g., in secret space 412 of the application).

After application-specific and application-version-specific secrets have been computed by the secure kernel, the secure kernel deletes the sensitive portions of itself (including its private key, privileged code portions, and any other secrets of the secure kernel) (block 530). The secure kernel then fully transfers control (branches) to the application (block 532) (there being no further processing performed by the secure kernel until the next secure boot). If a new application is not loaded (block 518: No), then the secure kernel deletes the sensitive portions of itself (block 534), then passes control to the application code address indicated in mailbox area 308 (i.e., to the application which initiated the warm boot triggering the execution of the secure kernel) (block 536).

A preferred embodiment of the present invention provides a secure overlay capability to allow programs that exceed the available physical memory space of the computer to be executed. In this secure overlay scheme, a single large application is broken into two or more smaller applications (overlays) that can be executed from the same memory space (i.e., application area 306) by overwriting one of the smaller applications with another of the smaller applications when the latter needs to be executed. So that the data may be shared among these smaller applications, each of the applications contains embedded cryptographic keys, which may be used to encrypt or decrypt information to be stored persistently (in persistent storage 310 in FIG. 3) while control is transferred from one application to the other.

In a preferred embodiment, in which public-key cryptography is utilized, each application has a private key, which only that application can access, as well as a public key, which is shared among all of the smaller applications making up the large application. In the alternative, symmetric key cryptography (in which each application possesses a single key, which is used for both encryption and decryption) can be used. In the case of symmetric key cryptography, the applications may contain embedded keys for this purpose, or the key may be computed at run-time by the secure kernel, as described in FIGS. 5-7.

Figure 8:
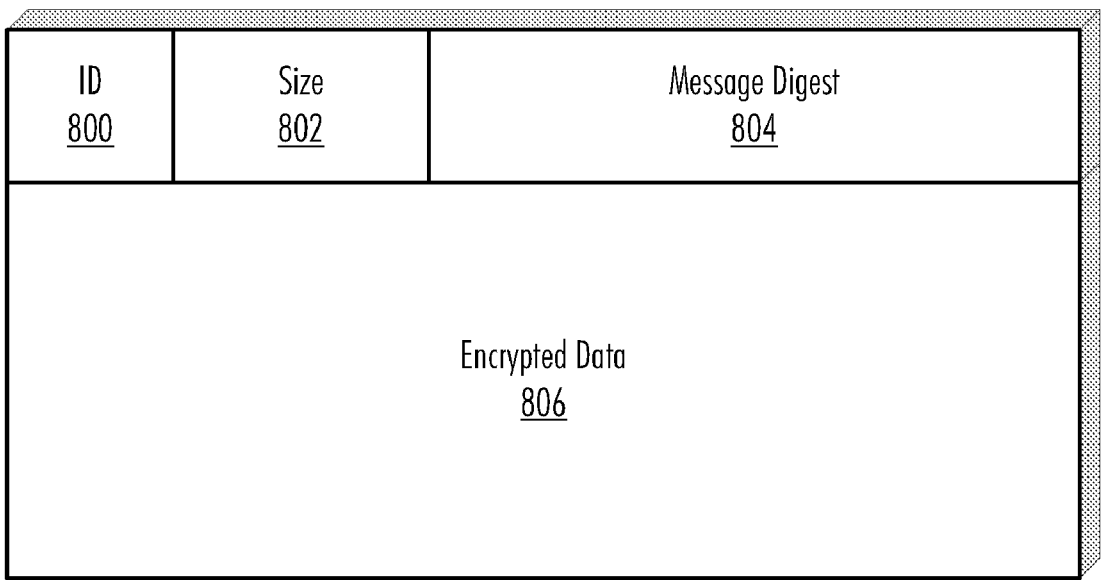
FIG. 8 is a diagram of an item of encrypted shared data for use in conjunction with secure overlays in a preferred embodiment of the present invention.

An example of an item of encrypted shared data stored in persistent storage 310 for use in conjunction with secure overlays is provided in FIG. 8. The encrypted data itself (encrypted data 806) is preceded by a header providing information about the encrypted data. Within the header, an identification code 800 uniquely identifies the data item and/or the data's source, so that it may be located by the appropriate application. A size value 802 records the size of encrypted data 806, so that the end of encrypted data 806 may be determined: this allows multiple such blocks of encrypted data to be stored sequentially in persistent storage 310. Message digest 804 is the value of a cryptographic hash function computed over the plaintext version of encrypted data 806. When encrypted data 806 is decrypted by an application, the application can compute the same cryptographic hash function over the decrypted data and compare the value to message digest 804 to verify the integrity of the decrypted data.

Figure 9:
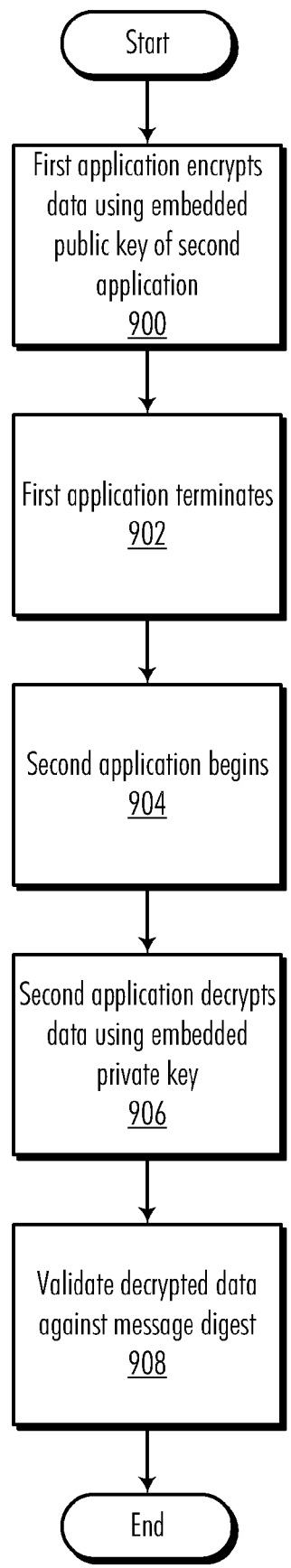
FIG. 9 is a flowchart representation of a process of providing secure program overlays in a preferred embodiment of the present invention.

FIG. 9 is a flowchart representation of a process of providing secure program overlays in a preferred embodiment of the present invention. FIG. 9 shows the actions performed in passing control from a first application to a second application that will share data from the first application. Before actually passing control to a second application (or overlay), the currently executing application encrypts data to be shared with the second application using the second application's public key (which is embedded into the first application) and stores this data in persistent storage 310 (block 800). The first application then terminates (block 802) and the second application is started (block 804). The second application then uses its private key to decrypt the data encrypted by the first application (block 806). Finally, the second application validates the decrypted data by computing a cryptographic hash function over the decrypted data and comparing the computed value with the message digest stored with the encrypted data (block 808).

One of the preferred implementations of the invention is a computer program, namely, a set of instructions (program code) or other functional descriptive material in a code module that may, for example, be resident in the random access memory of the computer. Until required by the computer, the set of instructions may be stored in another computer memory as a computer program product in one or more computer readable storage media, for example, in a hard disk drive, or in a removable memory such as an optical disk (for eventual use in a CD ROM) or floppy disk (for eventual use in a floppy disk drive); or the set of instructions may be downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an;" the same holds true for the use in the claims of definite articles. Where the word "or" is used in the claims, it is used in an inclusive sense (i.e., "A and/or B," as opposed to "either A or B").

What is claimed is:

1. A computer-performed method of supporting program code overlays in a data processing system, comprising:
    executing a first application in the data processing system, wherein the first application is associated with an encryption key and wherein executing the first application includes encrypting input data for a second application using the encryption key, and writing the encrypted input data to data storage in the data processing system;
    decrypting, using initialization hardware, an encrypted copy of an operating kernel into the data storage;
    executing the operating kernel, wherein the operating kernel decrypts the second application into the data storage;
    transferring control of the data processing system to the second application from the operating kernel;
    deleting one or more cryptographic secrets prior to transferring control of the data processing system to the second application;
    executing the decrypted second application in the data processing system, wherein the second application is associated with a decryption key and wherein executing the second application includes reading the encrypted input data from the data storage;
    decrypting the encrypted input data; and
    performing additional computation on the decrypted input data.

2. The method of claim 1, wherein the input data is state information regarding a computational state of the first application.

3. The method of claim 1, wherein the decryption key is contained within the second application.

4. The method of claim 1, wherein the encryption key is a public key in a public-key cryptosystem and the decryption key is a private key in the public-key cryptosystem.

5. The method of claim 1, wherein the encryption key and decryption key are identical.

6. The method of claim 1, wherein the writing includes writing an error detection code associated with the input data, and wherein the additional computation includes verifying the decrypted input data against the error detection code.

7. The method of claim 1, further comprising:
    decrypting the first application from an encrypted copy of the first application prior to executing the first application in the data processing system.

8. The method of claim 1, wherein the data storage includes memory, registers, or secondary data storage.

9. A computer program product in one or more computer-readable storage media, comprising functional descriptive material that, when executed by a computer, causes the computer to perform actions of:
    executing a first application in a data processing system, wherein the first application is associated with an encryption key and wherein executing the first application includes encrypting input data for a second application using the encryption key, and
    writing the encrypted input data to data storage of the data processing system;
    decrypting, using initialization hardware, an encrypted copy of an operating kernel into the data storage;
    executing the operating kernel, wherein the operating kernel decrypts the second application into the data storage;
    transferring control of the data processing system to the second application from the operating kernel;
    deleting one or more cryptographic secrets prior to transferring control of the data processing system to the second application;
    executing the decrypted second application in the data processing system, wherein the second application is associated with a decryption key and wherein executing the second application includes reading the encrypted input data from the data storage;
    decrypting the encrypted input data; and
    performing additional computation on the decrypted input data.

10. The computer program product of claim 9, wherein the input data is state information regarding a computational state of the first application.

11. The computer program product of claim 9, wherein the decryption key is contained within the second application.

12. The computer program product of claim 9, wherein the encryption key is a public key in a public-key cryptosystem and the decryption key is a private key in the public-key cryptosystem.

13. The computer program product of claim 9, wherein the encryption key and decryption key are identical.

14. The computer program product of claim 9, wherein the writing includes writing an error detection code associated with the input data, and wherein the additional computation includes verifying the decrypted input data against the error detection code.

15. The computer program product of claim 9, comprising functional descriptive material that, when executed by a computer, causes the computer to perform the additional action of:
    decrypting the first application from an encrypted copy of the first application prior to executing the first application in the data processing system.

16. The computer program product of claim 9, wherein the data storage includes memory, registers, or secondary data storage.

17. A data processing system comprising:
    at least one processor;

initialization hardware, wherein the initialization hardware is configured to initialize a state of the at least one processor;

memory accessible to the at least one processor;

data storage accessible to the at least one processor;

an encrypted operating kernel stored in the data storage, wherein the encrypted operating kernel contains one or more cryptographic secrets;

a first application stored in the data storage, wherein the first application is associated with an encryption key; and a second application stored in encrypted form in the data storage, wherein the second application is associated with a decryption key, wherein the at least one processor loads the first application into the data storage and performs additional actions including executing the first application, wherein executing the first application includes encrypting input data for the second application using the encryption key, and writing the encrypted input data to the data storage;

decrypting, using the initialization hardware, the encrypted operating kernel into the data storage;

executing the decrypted operating kernel, wherein the decrypted operating kernel, using one or more cryptographic secrets, decrypts the second application into the data storage so as to overwrite in memory at least a portion of the first application;

transferring control of the at least one processor to the second application from the operating kernel;

deleting the one or more cryptographic secrets prior to transferring control of the at least one processor to the second application;

executing the decrypted second application, wherein executing the second application includes reading the encrypted input data from the data storage; and decrypting the encrypted input data.

18. The data processing system of claim 17, wherein the input data is state information regarding a computational state of the first application.

19. The data processing system of claim 17, wherein the encryption key is a public key in a public-key cryptosystem and the decryption key is a private key in the public-key cryptosystem.

20. The data processing system of claim 17, wherein the first application is stored in encrypted form in the data storage, and wherein loading the first application into the memory includes decrypting the first application from the data storage into the memory.

\* \* \* \* \*